though, as pointed out in the aforementioned Cosby et al. patent, the crude phthalonitriles are suitable for many purposes without purification.

2,833,807
PRODUCTION OF PHTHALONITRILES

Adalbert Farkas, Media, and Rudolph Rosenthal, East Lansdowne, Pa., assignors to Allied Chemical & Dye Corporation, New York, N. Y., a corporation of New York No Drawing. Application June 26, 1956
Serial No. 593,795

6 Claims. (Cl. 260—465)

This invention relates to a process for the production of phthalonitriles by reacting xylenes with oxygen and controlled, low amounts of ammonia in the presence of certain fluidized oxidation catalysts. The process is an improvement on the process described in U. S. P. 2,499,055, which issued February 28, 1950, to John N. Cosby and Michael Erchak, Jr.

According to U. S. P. 2,499,055, phthalonitriles may be prepared by reacting xylenes with ammonia and oxygen at elevated temperatures in the presence of catalysts for the vapor phase partial oxidation of benzene and naphthalene, respectively, to maleic and phthalic anhydride. It is stated in this patent that in oxidizing xylenes to dinitriles it is preferred to employ about 4 or more mols of ammonia for every mol of xylene.

An object of the present invention is to provide an improved process for the production of phthalonitriles.

Another object of the present invention is to provide a process for the production of high yields of phthalonitriles from xylenes, oxygen and controlled, low amounts of ammonia.

Further objects and advantages of the present invention will be apparent to those skilled in the art from the following description and examples.

We have made the surprising discovery that by carrying out the reaction of xylenes, ammonia and oxygen in the presence of a catalyst for the vapor phase partial oxidation of benzene and naphthalene, respectively, to maleic and phthalic anhydride, said catalyst being in fluidized form, while employing controlled, low quantities of ammonia, high yields of phthalonitriles are obtained. In addition, we have found that certain operational advantages hereinafter described result from the combined use of the fluidized catalyst and low quantities of ammonia.

More specifically, in accordance with the present invention, high yields of phthalonitrile product are obtained by mixing a xylene with air or other oxygen-containing gas and ammonia, the mol ratio of ammonia to xylene being in the range of about 2 to 3.5:1. The mixture is then passed at temperatures ranging from about 300° to 550° C. into contact with a fluidized bed of a catalyst for the vapor phase partial oxidation of benzene and naphthalene, respectively, to maleic and phthalic anhydride. A representative set of conditions is as follows: passing a gaseous reaction mixture containing about 2 to 3.5 mols of ammonia and about 3 to 30 mols of oxygen for every mol of xylene upwardly through a fluidized bed of a catalyst active for oxidizing benzene to maleic anhydride at a temperature of about 300° to 550° C. and at a space velocity of 1000 to 3000 cc. of reaction gas (calculated at S. T. P.) per hour per cubic centimeter apparent volume of catalyst.

The xylenes suitable for conversion into phthalonitriles by the process of this invention include ortho-xylene, meta-xylene and para-xylene, as well as mixtures of two or more of these xylenes.

As stated above, the reaction mixture contains about 2 to 3.5 mols of ammonia for each mol of xylene. In place of ammonia a primary alkyl amine may be used to form the phthalonitriles of this invention. When a primary alkyl amine is employed instead of ammonia, the same molecular proportions of amine as described for ammonia are used.

The oxidizing agent used in the present process is oxygen. Although air is the preferred oxygen-containing medium, the feed mixture can also be made up with oxygen, oxygen-enriched air or air or oxygen diluted with nitrogen, carbon dioxide, steam or other inert gases. Generally speaking, suitable mol ratios of oxygen to xylene reactant range from about 3 to 30:1.

The catalyst employed in carrying out our process may be any of the catalysts which have been found particularly suitable for oxidizing benzene to maleic anhydride or naphthalene to phthalic anhydride. The preparation and composition of such catalysts are disclosed, for example, in U. S. Patents 2,081,272, issued May 25, 1937; 2,180,353, issued November 21, 1939; and 2,294,130, issued August 25, 1942. Among the numerous catalysts which may be employed in carrying out our process are thorium, molybdenum, vanadium, tin, chromium, tungsten, cobalt, iron, manganese or copper, employed as the metals or the metal oxides, the oxides of aluminum, uranium, etc., vanadates, vanadic acid and mixtures of these various catalysts with each other and with other materials, particularly catalysts containing both vanadium and molybdenum oxides. Further, it is desirable that the catalysts be supported on a support such as activated alumina, Alundum or silica-alumina.

The catalysts are utilized in finely divided form in the present invention and generally have a catalyst size ranging from about 50 to 300 microns (about 50–270 mesh). The catalyst may be maintained in fluidized form by passing the gaseous reaction mixture upwardly through the catalyst bed disposed in a suitable reactor at linear gas velocities of about 0.02 to 1 foot per second, while maintaining suitable catalyst bed depth of say 2 to 100 inches to maintain the desired space velocity. Linear gas velocity is defined as the ratio of the flow rate of gas (calculated at S. T. P.) to the internal cross-section of the reactor.

It is important in obtaining the desired results of the present invention to control the reaction temperatures within an optimum range depending upon the particular catalyst employed. In general, the reaction mixture containing xylene reactant, oxygen and ammonia is contacted with the catalyst at temperatures varying from about 300° to 550° C. Optimum temperature ranges for specific catalysts may be determined by simple experimentation. For example, a catalyst comprising oxides of vanadium, molybdenum and phosphorus supported on activated alumina has been found to have optimum temperatures of about 300° to 400° C. Optimum temperatures for a catalyst comprising oxides of vanadium, molybdenum and phosphorus supported on Alundum are about 450° to 550° C. A catalyst containing as active ingredient only vanadium pentoxide, on the other hand, has been found to have optimum temperatures of about 400° to 500° C.

The contact time defined as the ratio of the apparent catalyst volume to the flow rate of gas (at reaction conditions) is generally within the range of 0.1 to 10 seconds. Contact time may be varied for any given depth of catalyst bed by adjusting the space velocity of the gaseous reactants.

The initial nitrile product, obtained by separation, as by filtration, of unreacted xylene from total product, generally contains at least about 70% by weight of phthalonitriles. If desired or required, this initial nitrile product may be purified by simple sublimation or distillation procedures to produce a final phthalonitrile product which is pure or essentially so.

Our invention will be further illustrated by the following examples.

*Example 1.*—Para-xylene mixed with ammonia, oxygen and nitrogen, in the proportions of 3.0 mols of ammonia, 3.86 mols of oxygen and 92.14 mols of nitrogen for each mol of para-xylene, was passed upwardly through a fluidized bed about 2.5 inches deep of a finely divided catalyst comprising oxides of vanadium, molybdenum and phosphorus supported on activated alumina at 377° C., at a space velocity of 1800, which corresponded to a contact time of 0.84 second, and at a linear velocity of 0.11 ft. per second (calculated at S. T. P.).

The catalyst had a particle size of about 105 to 297 microns and was prepared as follows: activated alumina was impregnated with a hydrochloric acid solution of ammonium metavanadate, molybdic anhydride and phosphoric acid. The mixture was then evaporated to dryness, roasted at 400° C., and then screened to separate the portion from about 105 to 297 microns. The finished catalyst contained 20% $V_2O_5$, 6.5% $MoO_3$ and 0.07% $P_2O_5$.

The terephthalonitrile in the reaction product was recovered by collecting the product in a glass trap in which the material leaving the reactor was passed through a filter cloth. The crude product collected in the trap was dissolved in acetone and then transferred into an evaporating vessel where the major portion of the acetone was evaporated. The residue was diluted with water, and solid terephthalonitrile was filtered off and dried. The yield of recovered terephthalonitrile was 65.2 mol percent based on the xylene fed.

*Example 2.*—Meta-xylene was mixed with 2.92 mols of ammonia, 3.98 mols of oxygen and 92.1 mols of nitrogen for every mol of meta-xylene, and was passed upwardly through a fluidized bed about 2.5 inches deep of the catalyst of Example 1 at a temperature of 423° C., at a space velocity of 1800, which corresponded to a contact time of 0.78 second, and at a linear velocity of 0.11 ft. per second (calculated at S. T. P.).

Upon treatment of the reaction products in accordance with the procedure of Example 1, a 36.1 mol percent yield of isophthalonitrile based on the meta-xylene fed was obtained.

*Example 3.*—Para-xylene mixed with ammonia, oxygen and nitrogen, in the proportions of 2.7 mols of ammonia, 8.7 mols of oxygen and 87.6 mols of nitrogen for each mol of para-xylene, was passed upwardly through a fluidized bed about 2 inches deep of a finely divided catalyst comprising oxides of vanadium, molybdenum and phosphorus supported on Alundum at about 428° C., at a space velocity of 1720, which corresponded to a contact time of 0.81 second, and at a linear velocity of 0.10 ft. per second (calculated at S. T. P.).

The catalyst had a particle size of about 105 to 210 microns and was prepared as follows: Alundum was impregnated with a hydrochloric acid solution of ammonium metavanadate, molybdic anhydride and phosphoric acid. The mixture was then evaporated to dryness, roasted at 400° C. and screened to separate the portion from about 105 to 210 microns. The finished catalyst contained 20% $V_2O_5$, 6.5% $MoO_3$ and 0.08% $P_2O_5$.

The reaction product was collected in a glass trap. Terephthalonitrile was dissolved out of a part of the reaction product with acetone. The acetone solution was evaporated to near dryness, flooded with water to precipitate out a nearly white product, filtered, washed with Skellysolve (a petroleum solvent) to remove any p-tolunitrile present and then dried. p-Tolunitrile was extracted out of another part of the reaction product with benzene. The extract was distilled to azeotrope off water and remove the bulk of the benzene. The concentrate was then distilled under vacuum, and the distillate collected at 65 mm. Hg from 120° to 135° C. comprised p-tolunitrile.

The recovered terephthalonitrile represented a 41.0 mol percent yield based on the para-xylene fed, while the recovered p-tolunitrile represented a 14.0 mol percent yield based on the para-xylene fed.

*Example 4.*—Para-xylene mixed with ammonia, oxygen and nitrogen in the proportions of 2.0 mols of ammonia, 10.4 mols of oxygen and 86.6 mols of nitrogen for each mol of para-xylene, was passed upwardly through a fluidized bed about 2.5 inches deep of the catalyst of Example 3 at a temperature of about 426° C., at a space velocity of 1690, which corresponded to a contact time of 0.83 second, and at a linear velocity of 0.10 ft. per second (calculated at S. T. P.). Terephthalonitrile and p-tolunitrile were recovered from the reaction product by the procedures of Example 3. Yields based on the para-xylene fed were 30.5 mol percent of terephthalonitrile and 10.6 mol percent of p-tolunitrile.

By means of the present procedure wherein a fluidized bed of a catalyst for the vapor phase partial oxidation of benzene and naphthalene, respectively, to maleic and phthalic anhydride and controlled, low quantities of ammonia are employed, several advantages are obtained. It is one of the unexpected advantages of the invention that acceptably high yields of phthalonitriles are realized upon use with the xylene charge of low quantities of ammonia. Further, the procedure of this invention results in efficiency of consumption of ammonia with a high degree of product selectivity. Thus, products containing quite low mononitrile content, as compared with dinitrile content, have been unexpectedly obtained at the low ammonia:xylene mol ratios of the present invention. In addition, use of low amounts of ammonia with the xylene charge avoids relatively expensive recovery of large quantities of ammonia, and requirements for quantity of catalyst and reactor size are reduced per unit of throughput of xylene charge.

The phthalonitriles produced by the process of this invention have substantial commercial use as raw materials or intermediates for the production of various polymeric synthetic resins, plastics and fibers.

While we have described the preferred embodiments for carrying out the process of our invention, it will be apparent that many changes may be made without departing from the spirit of the invention.

We claim:

1. The method of preparing phthalonitriles which comprises passing a gaseous mixture comprising a xylene, oxygen and about 2 to 3.5 mols of ammonia per mol of xylene upwardly through a finely divided catalyst for the vapor phase partial oxidation of benzene and naphthalene, respectively, to maleic and phthalic anhydride at linear velocity sufficient to effect fluidization of the catalyst, and maintaining said gaseous mixture in contact with the catalyst at a temperature of about 300 to 550° C.

2. The method of preparing phthalonitriles which comprises passing a gaseous mixture comprising a xylene, at least about 3 mols of oxygen and about 2 to 3.5 mols of ammonia for every mol of xylene upwardly through a finely divided catalyst for the vapor phase partial oxidation of benzene and naphthalene, respectively, to maleic and phthalic anhydride at linear velocity sufficient to effect fluidization of the catalyst, and maintaining said gaseous mixture in contact with the catalyst at a temperature of about 300 to 550° C.

3. The method of preparing phthalonitriles which comprises passing a gaseous mixture comprising a xylene, ammonia and oxygen, in the proportions of about 3 to 30 mols of oxygen and about 2 to 3.5 mols of ammonia for every mol of xylene, upwardly through a finely divided oxidation catalyst containing the oxides of vanadium, molybdenum and phosphorus at linear velocity sufficient to effect fluidization of the catalyst, and maintaining said gaseous mixture in contact with the catalyst at a temperature of about 300 to 550° C.

4. The method of preparing terephthalonitrile which comprises passing a gaseous mixture comprising para-xylene, ammonia and oxygen, in the proportions of about 3 to 30 mols of oxygen and about 2 to 3.5 mols of ammonia for every mol of para-xylene, upwardly through a finely divided oxidation catalyst containing the oxides of vanadium, molybdenum and phosphorus at linear velocity sufficient to effect fluidization of the catalyst, and maintaining said gaseous mixture in contact with the catalyst at a temperature of about 300 to 550° C.

5. The method of preparing isophthalonitrile which comprises passing a gaseous mixture comprising meta-xylene, ammonia and oxygen, in the proportions of about 3 to 30 mols of oxygen and about 2 to 3.5 mols of ammonia for every mol of meta-xylene, upwardly through a finely divided oxidation catalyst containing the oxides of vanadium, molybdenum and phosphorus at linear velocity sufficient to effect fluidization of the catalyst, and maintaining said gaseous mixture in contact with the catalyst at a temperature of about 300 to 550° C.

6. The method of preparing ortho-phthalonitrile which comprises passing a gaseous mixture comprising ortho-xylene, ammonia and oxygen, in the proportions of about 3 to 30 mols of oxygen and about 2 to 3.5 mols of ammonia for every mol of ortho-xylene, upwardly through a finely divided oxidation catalyst containing the oxides of vanadium, molybdenum and phosphorus at linear velocity sufficient to effect fluidization of the catalyst, and maintaining said gaseous mixture in contact with the catalyst at a temperature of about 300 to 550° C.

References Cited in the file of this patent

UNITED STATES PATENTS 2,499,055    Cosby et al. _____ Feb. 28, 1950

OTHER REFERENCES

Mahan et al.: Abstract of application Ser. No. 120,606, published June 5, 1951.